United States Patent [19]
White et al.

[11] Patent Number: 5,776,024
[45] Date of Patent: Jul. 7, 1998

[54] TENSIONER WITH INTEGRAL BODY AND ARM

[75] Inventors: David C. White, Dryden; Thomas J. Becker, Auburn, both of N.Y.

[73] Assignee: Borg-Warner Automotive, Inc., Sterling Heights, Mich.

[21] Appl. No.: 627,142

[22] Filed: Apr. 3, 1996

[51] Int. Cl.[6] ............................... F16H 7/08; F16H 7/22
[52] U.S. Cl. ...................... 474/110; 474/101; 474/111
[58] Field of Search ............................... 474/101, 109, 474/110, 111, 140

[56] References Cited

U.S. PATENT DOCUMENTS

| | | |
|---|---|---|
| 3,896,834 | 7/1975 | Paul, Jr. . |
| 4,708,969 | 11/1987 | Kimura et al. . |
| 4,741,299 | 5/1988 | Matsuura et al. ............... 123/90.31 |
| 4,874,352 | 10/1989 | Suzuki ............................. 474/110 |
| 4,881,927 | 11/1989 | Suzuki ............................. 474/110 |
| 4,889,087 | 12/1989 | Bergsten .......................... 123/90.31 |
| 4,909,777 | 3/1990 | Inoue et al. ..................... 474/110 |
| 4,911,679 | 3/1990 | Inoue et al. ..................... 474/110 |
| 4,940,447 | 7/1990 | Kawashima et al. ............ 474/110 |
| 4,950,209 | 8/1990 | Kawashima et al. ............ 474/138 |
| 4,963,121 | 10/1990 | Himura et al. .................. 474/110 |
| 4,986,796 | 1/1991 | Kawashima et al. ............ 474/101 |
| 5,116,284 | 5/1992 | Cho . |
| 5,181,889 | 1/1993 | Maruyama et al. ............. 474/110 |
| 5,184,982 | 2/1993 | Shiyama et al. . |
| 5,184,983 | 2/1993 | Shiyama et al. . |
| 5,222,917 | 6/1993 | Shiyama et al. . |
| 5,277,664 | 1/1994 | Mott . |
| 5,314,388 | 5/1994 | Suzuki et al. . |
| 5,318,482 | 6/1994 | Sato et al. . |
| 5,346,436 | 9/1994 | Hunter et al. . |
| 5,482,262 | 1/1996 | Hayakawa et al. ............. 267/226 |

FOREIGN PATENT DOCUMENTS 59-208250  11/1984  Japan .

Primary Examiner—Tamara L. Graysay
Assistant Examiner—Gary S. Hartmann
Attorney, Agent, or Firm—Hugh A. Abrams, Esq.; Greg Dziegielewski, Esq.

[57] ABSTRACT

A chain tensioner comprising an integrated tensioner body and tensioner arm. The tensioner body includes a fluid reservoir and a tensioner bore. The tensioner arm includes a pivot bore with a pivot pin disposed in the pivot bore to pivotally mount the tensioner arm. A check valve connecting the fluid reservoir to the tensioner bore permits fluid to flow into the tensioner bore, but not into the fluid reservoir. A plunger is slidably fitted into the tensioner bore and biased out from the tensioner bore by the fluid pressure in the tensioner bore. As a result, the plunger is forced against a fixed boss, causing rotational movement of the tensioner body and tensioner arm.

13 Claims, 4 Drawing Sheets

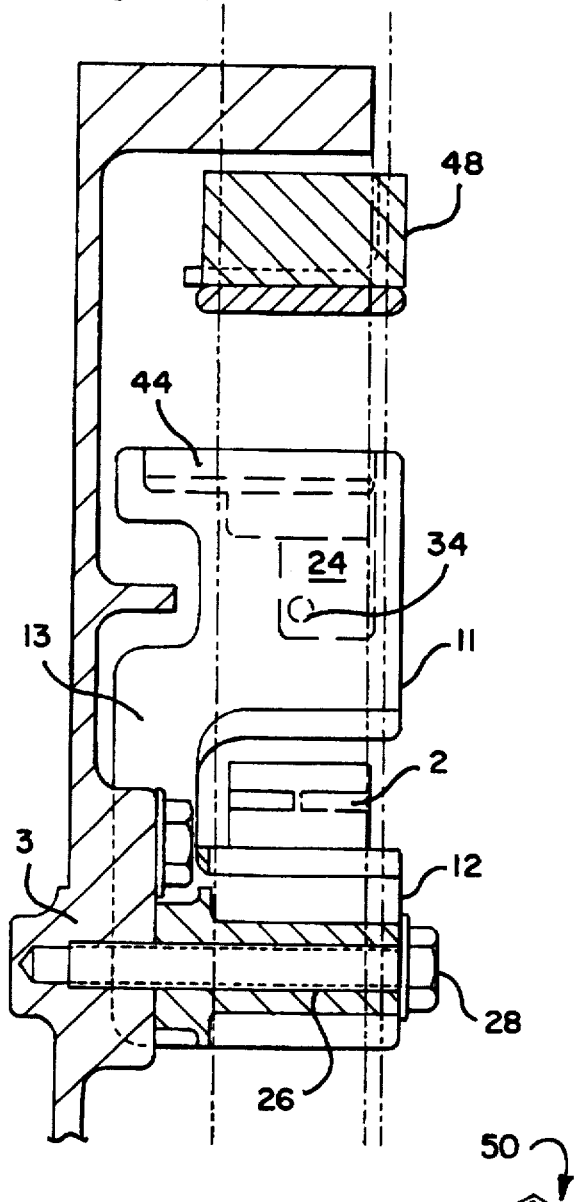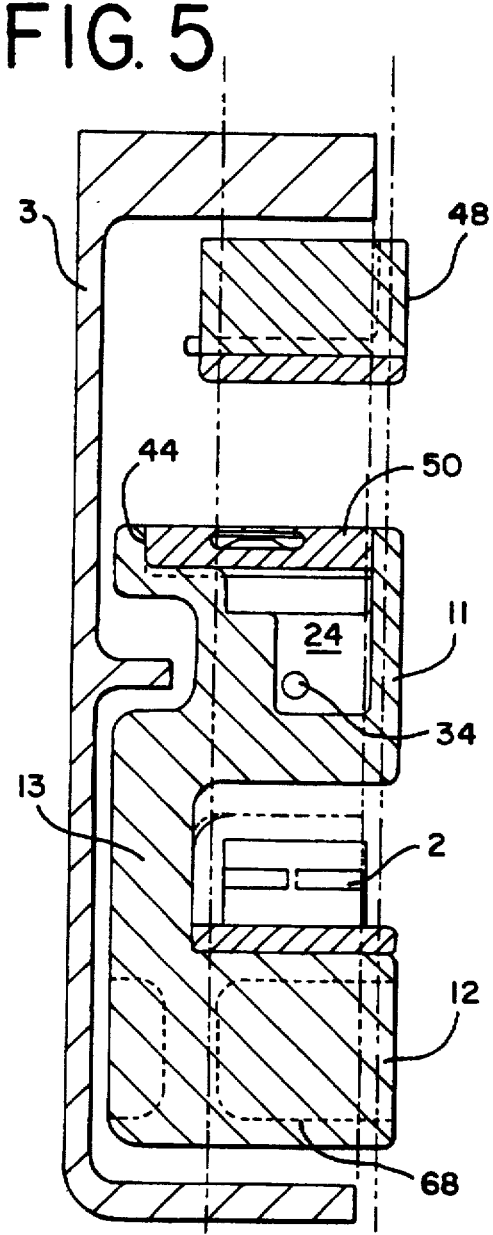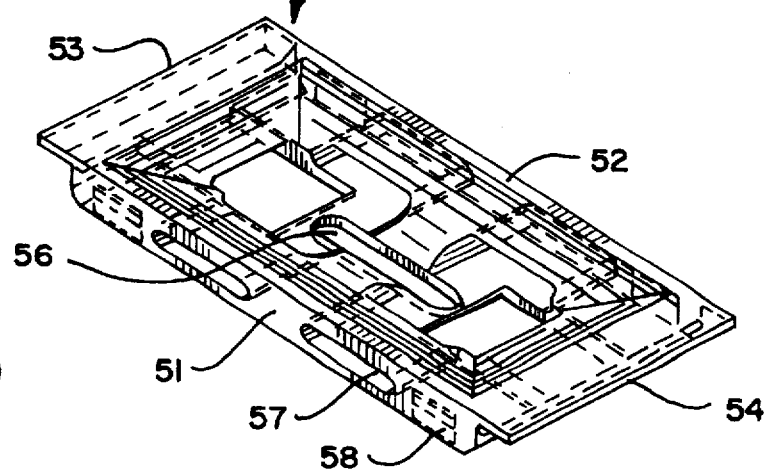

TENSIONER WITH INTEGRAL BODY AND ARM

CROSS-REFERENCE TO RELATED APPLICATION

The present invention is related to the commonly assigned, co-pending U.S. patent application Ser. No. 08/588,451, filed Jan. 18, 1996, entitled "Chain Tensioner With Integral Arm," and incorporated herein by reference.

BACKGROUND OF THE INVENTION

This invention relates to tensioners used with chain drives in automotive timing and power transmission applications, and more particularly to a chain tensioner with an integral body and arm.

Chain tensioning devices, such as hydraulic chain tensioners, are used as a control device for a power transmission chain, or any similar power transmission devices, as the chain travels between a plurality of sprockets. Generally, it is important to impart and maintain a certain degree of tension to the chain to prevent noises, slippage, or tooth jumping. Prevention of such tooth jumping is especially important in the case of a chain driven camshaft in an internal combustion engine because tooth jumping will throw off the camshaft timing by several degrees, possibly rendering the engine inoperative or causing damage. However, in the harsh environment in which an internal combustion engine operates, chain tension can vary between excessively high or low levels as a result of the wide variations in temperatures and differences between the coefficients of linear expansion among the various parts of the engine, including the chain and the tensioner. Moreover, wear to the chain components, during prolonged use, can result in a decrease in the tension of the chain. In addition, camshaft and crankshaft induced torsional vibrations cause chain tension to vary considerably. This tension variation results in chain elongation, determined by chain stiffness.

Hydraulic chain tensioners typically have a plunger slidably fitted into a chamber and biased outward by a spring to provide tension to the chain. A lever, arm, or shoe is often used at the end of the plunger to assist in the tensioning of the chain. The hydraulic pressure from an external source, such as an oil pump or the like, flows into the chamber through passages formed in the housing. The plunger is moved outward by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements are easy in one direction (outward) but difficult in the reverse direction (inward).

One example of a chain tensioner which uses a hydraulic tensioner and a pivoted lever to tension a chain is described in Sato et al., U.S. Pat. No. 5,318,482. Sato et al. show a conventional hydraulic tensioner with a plunger pressing a pivoted lever against a chain to impart an appropriate tension to the chain. The hydraulic tensioner and the pivoted lever, however, are completely separate from each other. Furthermore, the hydraulic tensioner is perpendicularly orientated with respect to the direction of chain travel.

Another example of a chain tensioner which uses a hydraulic tensioner and a shoe to tension a chain is described in Suzuki et al., U.S. Pat. No. 5,314,388. Suzuki et al. show an oil-operated tensioner with a plunger forcing a shoe against a chain to impart a tension to the chain. The tensioner is continuously supplied with oil from an external source such as an oil pump. Furthermore, the shoe is mounted outside the tensioner on the outer end of the plunger. Similar to the Sato chain tensioner, the hydraulic tensioner is also perpendicularly orientated with respect to the direction of chain travel.

In the present invention, a chain tensioner body having a hydraulic tensioner is integrated with a tensioner arm. The tensioner body also has a fluid reservoir for supplying the hydraulic tensioner with fluid. In addition, the hydraulic tensioner of the tensioner body is oriented substantially parallel to the tensioner arm and the chain that is to be tensioned. As a result, the integrated chain tensioner of the present invention is simpler and easier to install, especially in tight package space requirements.

SUMMARY OF THE INVENTION

The present invention provides a chain tensioner comprising an integrated tensioner body and tensioner arm. The tensioner body includes a fluid reservoir and a tensioner bore. The tensioner arm includes a pivot bore with a pivot pin disposed in the pivot bore to pivotally mount the tensioner arm. A connection member connects the tensioner arm and the tensioner body.

A check valve connecting the fluid reservoir to the tensioner bore permits fluid to flow into the tensioner bore, but not into the fluid reservoir. A plunger is slidably fitted into the tensioner bore and biased out from the tensioner bore by the fluid pressure in the tensioner bore. As a result, the plunger is forced against a fixed boss, causing rotational movement of the tensioner body and tensioner arm.

In one embodiment of the present invention, the tensioner body includes an opening to allow fluid to flow into the fluid reservoir. The tensioner body may also include a fluid retention plate disposed in the opening of the tensioner body to retain fluid in the fluid reservoir.

The chain tensioner of the present invention operates in the following manner. The chain tensioner is pivotally mounted about the pivot pin with a chain that needs to be tensioned traveling between the tensioner body and the tensioner arm. The plunger is biased outwardly from the tensioner bore by a spring. As a result, fluid from the fluid reservoir is drawn into the tensioner bore. The combined efforts of the spring and the fluid pressure in the tensioner bore cause the plunger to contact the boss and rotate the chain tensioner about the pivot pin and away from the boss. This rotational movement of the chain tensioner forces the tensioner arm upward against the chain that needs to be tensioned.

BRIEF DESCRIPTION OF THE DRAWINGS

FIG. 4 is a cross-sectional view of the chain tensioner of FIG. 1 taken along line 4—4.

FIG. 5 is a cross-sectional view of the chain tensioner of FIG. 1 taken along line 5—5.

FIG. 6 is a perspective view of a fluid retention plate used in the chain tensioner of FIG. 1.

DETAILED DESCRIPTION OF THE PREFERRED EMBODIMENTS

Figure 1:
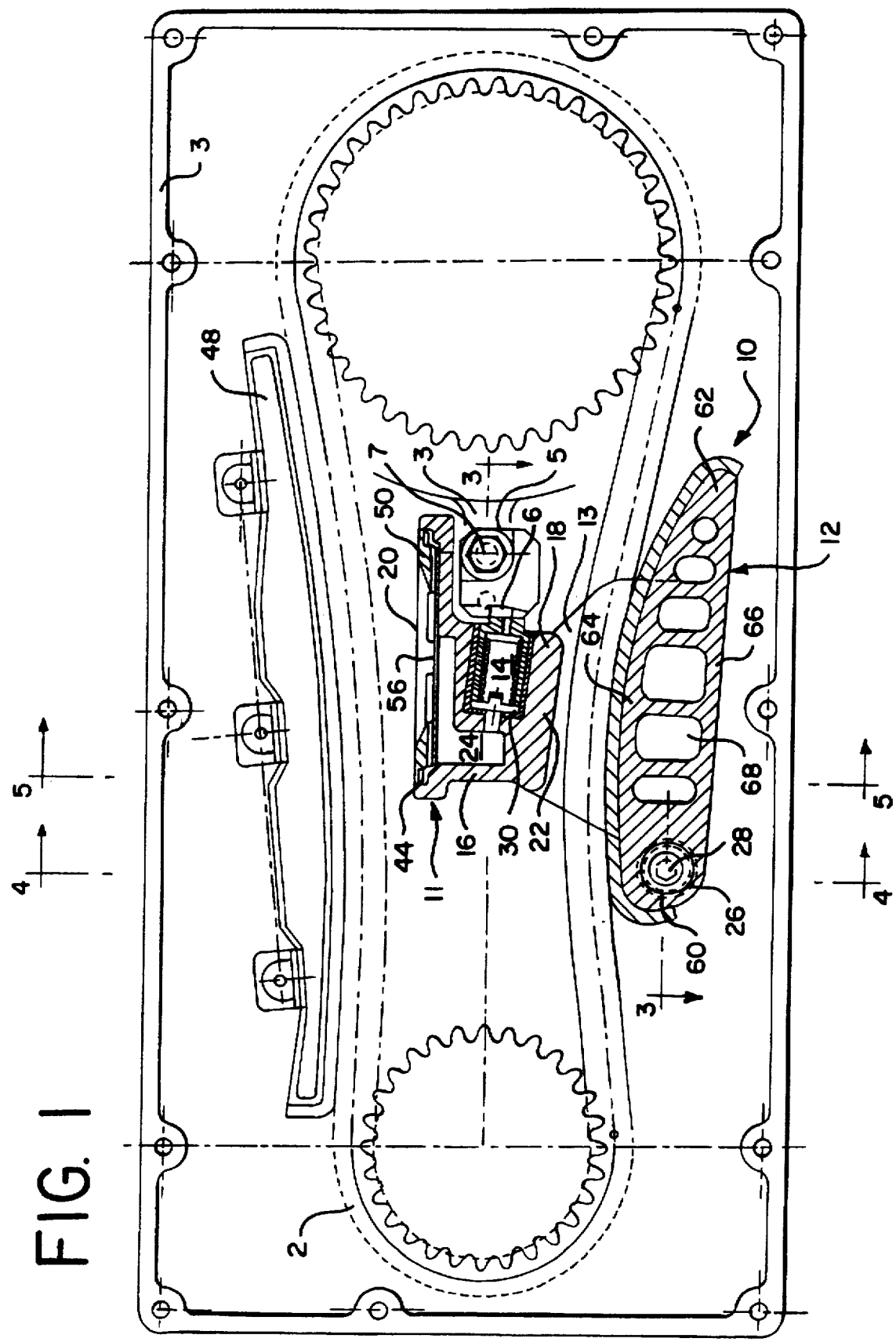
FIG. 1 is a side sectional view of the chain tensioner, with integral body and arm, of the present invention acting on a chain.

Turning now to the drawings, the figures depict the preferred embodiments of the present invention. FIG. 1 depicts the chain tensioner of the present invention used to maintain tension in chain 2. The chain tensioner 10 is positioned against the chain 2 that needs to be tensioned. As the chain begins to wear and lengthen, the chain tensioner 10 exerts a force on the chain to maintain tension on the chain, as seen in FIG. 2.

Figure 2:
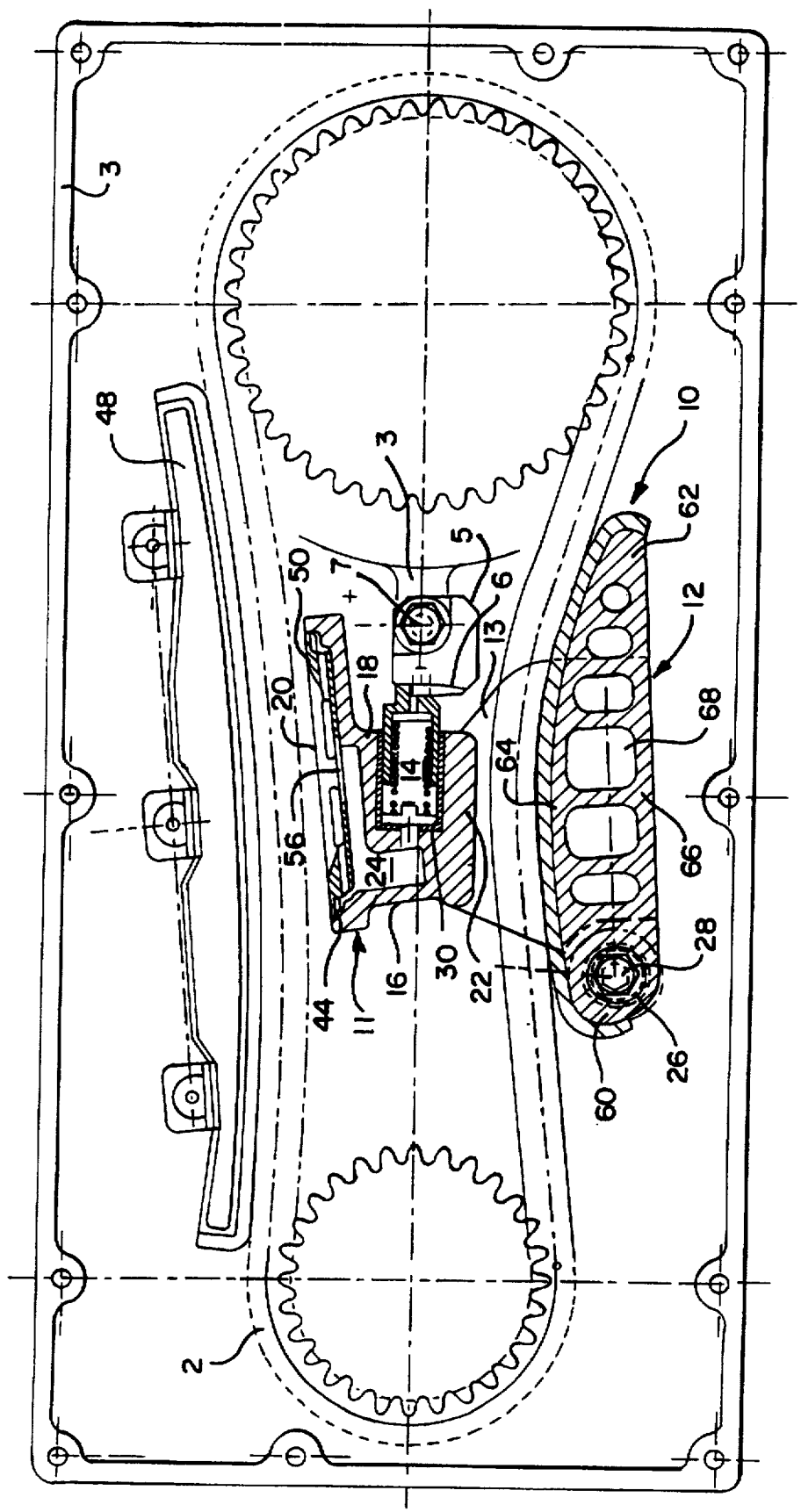
FIG. 2 is a side sectional view of the chain tensioner, with integral body and arm, of the present invention acting on a chain with the plunger of the chain tensioner extended to maintain tension on the chain.

In a preferred embodiment, as best shown in FIGS. 1–2, the chain tensioner 10 of the present invention comprises a tensioner body 11, a tensioner arm 12, and a hydraulic tensioner 14. The tensioner body, the tensioner arm, and the hydraulic tensioner are integrated to form a chain tensioner with only one overall component.

The tensioner body and tensioner arm of the chain tensioner are made of a strong and durable material such as nylon, aluminum or steel. Preferably, the tensioner body and tensioner arm are molded out of a synthetic material such as nylon due to weight considerations. It is also preferable to attach a durable wear resistant material to that part of the tensioner arm on which the chain travels. A synthetic material, such as nylon, which has high wearability and durability characteristics can be used for this attachment. In particular, Nylon 6/6 is one commercially available material that may be used. Alternatively, PEEK (polyester ethylene ketone), which also has high wearability and durability characteristics, may be used for the attachment.

As best seen in FIGS. 1–2, the tensioner body 11 has a first side 16 and a second side 18 opposite from the first side. A first end 20 is disposed between the first and second sides. A second end 22 is disposed between the first and second sides, and opposite from the first end. Preferably, the first and second ends join the first and second sides to form an integral piece.

A fluid reservoir 24 is defined by a cavity formed in at least a portion of the first side, the second side, the first end, and the second end of the body. The fluid reservoir may be filled with any type of fluid. Preferably, the fluid reservoir is filled with a lubricating fluid such as oil or automatic transmission fluid.

Figure 3:
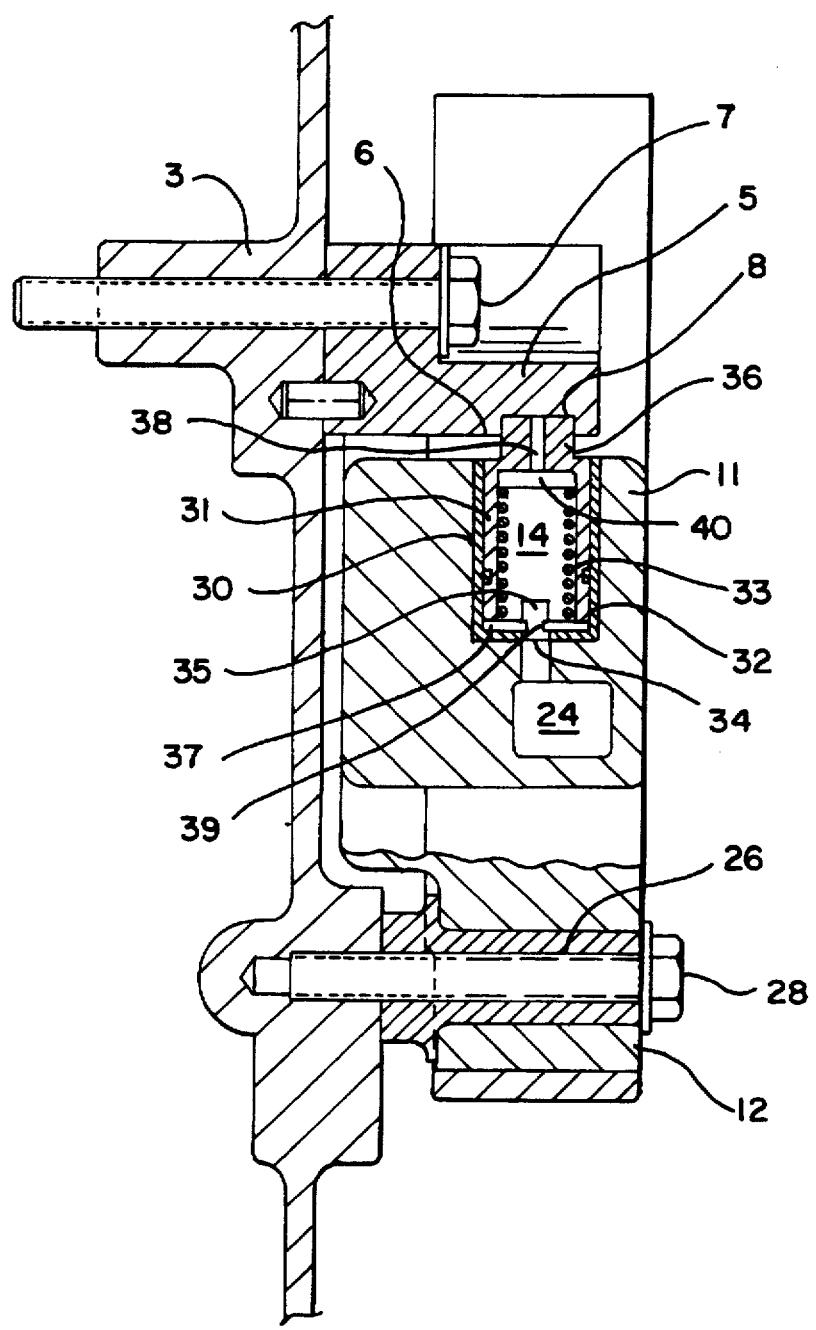
FIG. 3 is a cross-sectional view of the chain tensioner of FIG. 1 taken along line 3—3.

As shown in FIGS. 1–2, a tensioner bore 30 is formed in the second side of the body. The tensioner bore serves as a fluid chamber for a hydraulic tensioner 14, which is in communication with the fluid reservoir. The hydraulic tensioner 14 is oriented substantially parallel to the tensioner arm and the chain that needs to be tensioned. In contrast to conventional designs in which a piston extends from the tensioner in a direction perpendicular to the arm, this orientation allows the chain tensioner to be installed in tight package space requirements. This is especially important when the space above and below the chain tensioner limits the size of the chain tensioner. As best seen in FIG. 3, the hydraulic tensioner 14 comprises a sealing cup 32, a plunger 31, a support plate 37, a spring 33, and a check valve 35.

The sealing cup 32 is sealably mounted in the tensioner bore 30. The sealing cup may be formed integral with the tensioner bore and the second side of the tensioner body or may preferably be a separate element. The sealing cup 32 includes an aperture 34 for allowing fluid to flow from the fluid reservoir and into the tensioner bore through the sealing cup. The purpose of the sealing cup is to help seal the hydraulic tensioner in the tensioner bore and therefore reduce the ability of the hydraulic tensioner to leak fluid.

The plunger 31 is slidably fitted into the sealing cup 32. The plunger 31 has an upper end 36 with an aperture 38.

The support plate 37 is sealably mounted in the sealing cup 32 near the aperture 34 of the sealing cup. The support plate also has a central bore 39.

The spring 33 is disposed between the plunger 31 and the support plate 37. As a result, the spring biases the plunger outwardly from the tensioner bore 30 and the sealing cup 32, and against a boss 5. A fastener 7 may be used to fixedly mount the boss 5 to a mounting block 3, such as an engine block, housing, or chain case. Alternatively, the boss 5 may be formed integral with the mounting block 3. The boss 5 is positioned to cause rotational movement of the tensioner body 11 when the plunger extends and acts against the boss.

Additionally, the boss 5 includes a face 6 to receive the upper end of the plunger. Preferably, at least a portion of the face 6 is curved away from the plunger to facilitate easier movement of the plunger against the face as the chain tensioner pivots under chain wear conditions. Also, the face of the boss may have a slot 8 adapted to receive the plunger 31, as shown in FIG. 3. The slot helps to prevent the plunger, and thus the tensioner body 11, from moving in a direction perpendicular to the direction of chain travel.

The check valve 35 is disposed in the central bore 39 of the support plate 37. The check valve permits fluid to flow from the fluid reservoir and the aperture of the sealing cup through the central bore 39. However, the check valve restricts fluid from flowing out of the central bore and back into the fluid reservoir through the aperture of the sealing cup.

Generally, any type of check valve will work with the hydraulic tensioner of the present invention. For example, a ball check valve, such as that disclosed in Kimura et al., U.S. Pat. No. 4,708,696, the entire disclosure of which is incorporated herein by reference, may be used in the hydraulic tensioner of the present invention. Alternatively, a spring check valve, such as that disclosed in Paul Jr., U.S. Pat. No. 3,896,834, the entire disclosure of which is incorporated herein by reference, may be used in the hydraulic tensioner of the present invention. Moreover, a ball and spring check valve, such as that disclosed in Cho, U.S. Pat. No. 5,116,284, the entire disclosure of which is incorporated herein by reference, may be used in the hydraulic tensioner of the present invention. Finally, a variable orifice check valve, such as that disclosed in Mott, U.S. Pat. No. 5,277,664, the entire disclosure of which is incorporated herein by reference, may also be used in the hydraulic tensioner of the present invention.

In addition to the check valve, the hydraulic tensioner 14 may further include an air vent disc 40 disposed between the upper end of the plunger and the spring, as shown in FIG. 3. The air vent disc allows air to be removed from the hydraulic tensioner through the aperture 38 in the upper end of the plunger. An example of an air vent disc that may be used in the hydraulic tensioner of the present invention is disclosed in Hunter et al., U.S. Pat. No. 5,346,436, the entire disclosure of which is incorporated herein by reference.

Alternatively, the air vent disc 40 may be formed integrally on the back of the check valve (not shown). As a result, the air vent disc allows air to vent directly back into the fluid reservoir 24.

As shown in FIGS. 1–2 and 4, an opening 44 is provided in the first end of the tensioner body. The opening allows fluid to flow into the fluid reservoir 24 through the first end of the tensioner body.

Furthermore, a chain guide 48 may be provided on the chain that needs to be tensioned, above the opening 44. In addition to guiding the chain, the chain guide can be designed to collect fluid and direct it into the fluid reservoir through the opening in the first end of the tensioner body.

Also, a fluid retention plate 50 may be located in the opening 44. As shown in FIG. 6, the fluid retention plate 50 has a first side 51, a second side 52, a third side 53 disposed between the first and second sides, and a fourth side 54 disposed between the first and second sides opposite the third side.

The fluid retention plate also includes a central orifice 56. The central orifice allows fluid to flow into the fluid reservoir, while the rest of the fluid retention plate restricts fluid from flowing out of the fluid reservoir through the opening. The fluid trapped in the fluid reservoir by the fluid retention plate provides the hydraulic tensioner with the fluid necessary for its operation.

As seen in FIGS. 1–2 and 6, the fluid retention plate has a funnel shape that opens away from the fluid reservoir and toward the chain guide. As a result of this funnel shape, fluid that is collected by the fluid retention plate is directed into the central orifice and thus flows into the fluid reservoir.

Furthermore, one or more pockets 57 may be included in the sides of the fluid retention plate. Preferably, two pockets are disposed in each of the first and second sides of the fluid retention plate, and one pocket is disposed in each of the third and fourth sides of the fluid retention plate. The pockets collect fluid that splashes or spills out from the fluid reservoir through the central orifice during adverse operating conditions such as excess vibration or lean. Once the adverse operating conditions have ceased, the fluid that was collected by the pockets flows back into the fluid reservoir through the central orifice.

Preferably, the fluid retention plate 50 snap fits into the opening 44. As shown in FIG. 6, this snap fitting may be accomplished by providing a plurality of locking tabs 58 on the sides of the fluid retention plate. Preferably, two locking tabs are provided on both the first and second sides of the fluid retention plate.

As seen in FIGS. 1–2, the tensioner arm 12 has a first side 60 and a second side 62 opposite from the first side. A first end 64 is disposed between the first and second sides of the tensioner arm. A second end 66 is disposed between the first and second sides, and opposite from the first end of the tensioner arm. Preferably, the first and second ends join the first and second sides of the tensioner arm to form an integral component.

The first end of the tensioner arm provides a chain wear surface that is in contact with the chain to be tensioned. Preferably, the first end is arcuately shaped to provide a suitable chain travel surface. Of course, it will be understood by one skilled in the art that the first end can have any suitable shape as dictated by manufacturing concerns.

As also seen in FIGS. 1–2, a pivot bore 26 may be disposed in the first side 60 of the tensioner arm. A pivot pin 28 is disposed in the pivot bore 26 to pivotally mount the tensioner arm 12 near the chain that needs to be tensioned.

The tensioner arm 12 may also include one or more cavities 68 located between the first and second sides of the tensioner arm. Providing one or more cavities allows the tensioner arm to be lightweight and yet still provide sufficient support for the chain wear surface.

As shown in FIGS. 1–2, a connection member 13 connects the second end of the tensioner body 11 to the first end of the tensioner arm 12. The connection member is preferably formed integral with the first end of the tensioner arm and the second end of the tensioner body, but may also be a separate element. The connection member is also positioned offset from the center of the both the tensioner body and the tensioner arm.

The chain 2 that is to be tensioned by the chain tensioner 10 travels between the tensioner body and the tensioner arm. The chain is also substantially aligned with the center of both the tensioner body and the tensioner arm, as shown in FIGS. 4–5. As a result, the chain runs along the inside of the connection member.

The chain tensioner of the present invention operates in the following manner. As shown in FIG. 1, the chain tensioner 10 is pivotally mounted about the pivot pin 28 with the chain 2 that needs to be tensioned traveling between the tensioner body 11 and the tensioner arm 12. The spring 33 biases the plunger 31 outwardly from the tensioner bore 30 and the sealing cup 32. As a result, the hydraulic tensioner 14 draws fluid from the fluid reservoir 24 into the tensioner bore through the aperture 34 of the sealing cup 32. The combined efforts of the spring and the fluid pressure in the sealing cup cause the plunger to contact the fixed boss 5.

As shown in FIG. 2, the plunger contacting the fixed boss causes the tensioner body 11, and thus the connected tensioner arm 12, to rotate about the pivot pin 28 away from the boss 5. The rotational movement of the tensioner arm about the pivot pin forces the tensioner arm upward against the chain that needs to be tensioned. Since the check valve 35 only allows fluid to flow into the hydraulic tensioner and restricts fluid from flowing out of the hydraulic tensioner, the fluid pressure in the hydraulic tensioner is maintained. Therefore, the fluid pressure, along with the force of the spring, continues to bias the plunger against the fixed boss, thereby causing the tensioner arm to maintain tension on the chain.

In operation, the present invention can be applied with particular advantage to internal combustion engine timing systems having a chain of small center distance between sprockets that are horizontal or nearly horizontal. Of course, it is understood by one skilled in the art that the tensioner body may be modified to allow the present invention to be applied to internal combustion engine timing systems having a chain of small center distance between sprockets that are vertical or nearly vertical. In particular, an opening may be disposed in the second side of the tensioner body, instead of the first end, to allow fluid to flow into the fluid reservoir when the present invention is used with vertical or nearly vertical sprockets. It is also understood by one skilled in the art that the sides and ends of the tensioner body and tensioner arm may have any suitable length necessary to provide the desired tensioning force in the allotted amount of space. Likewise, the length of the plunger in the hydraulic tensioner can be any suitable length necessary to provide the desired tensioning force for given space requirements. It is also readily apparent that the present invention can be utilized to tension other types of devices.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A chain tensioner with an integral body and arm assembly comprising:

a tensioner body, the tensioner body including a fluid reservoir and a tensioner bore;

a check valve connecting the fluid reservoir to the tensioner bore to permit fluid flow from the fluid reservoir into the tensioner bore and restrict fluid flow from the tensioner bore into the fluid reservoir;

a boss fixedly mounted to a mounting block;

a plunger having a first end and a second end, said first end of said plunger slidably fitted in said tensioner bore and said second end rigidly attached to said boss;

a tensioner arm having a first side and a second side opposite said first side, a first end disposed between said first and second sides of said tensioner arm and a second end opposite said first end disposed between said first and second sides, said tensioner arm being rigidly attached to the tensioner body at said first end, the tensioner arm having a pivot bore disposed in said first side of said tensioner arm;

a pivot pin disposed in the pivot bore, the pivot pin mounting the tensioner arm for pivotal rotation with respect to said mounting block;

a flow of fluid into the tensioner bore causing the plunger to extend from the tensioner bore and against the boss to cause rotational movement of the tensioner body and tensioner arm.

2. The chain tensioner of claim 1 further comprising a connection member extending between the tensioner body and the tensioner arm.

3. The chain tensioner of claim 2 wherein the tensioner body and tensioner arm are on opposite sides of a chain that travels alongside the connection member.

4. The chain tensioner of claim 1 wherein the boss includes a face positioned to receive the extending plunger and to cause pivotal movement of the tensioner body away from the boss.

5. The chain tensioner of claim 1 wherein the tensioner body and tensioner arm are on opposite sides of a chain.

6. The chain tensioner of claim 1 wherein the plunger extends in a direction substantially parallel to the direction that a chain travels.

7. The chain tensioner of claim 1 wherein the rotational movement of the tensioner body causes rotational movement of the tensioner arm and the rotational movement of the tensioner arm causes a chain to be tensioned.

8. A chain tensioner with an integral body and arm assembly comprising:

a tensioner body, the tensioner body including a fluid reservoir and a tensioner bore;

a check valve connecting the fluid reservoir to the tensioner bore to permit fluid flow from the fluid reservoir into the tensioner bore and restrict fluid flow from the tensioner bore into the fluid reservoir;

a plunger slidably fitted in the tensioner bore;

a tensioner arm operatively connected to the tensioner body, the tensioner arm having a pivot bore;

a pivot pin disposed in the pivot bore, the pivot pin mounting the tensioner arm for pivotal rotation with respect to a mounting block;

a boss fixedly mounted to the mounting block;

a flow of fluid into the tensioner bore causing the plunger to extend from the tensioner bore and against the boss to cause rotational movement of the tensioner body and tensioner arm;

a sealing cup mounted within the tensioner bore and along the outside of the plunger, the sealing cup having an aperture to permit fluid communication between the tensioner bore and the fluid reservoir;

a support plate mounted in the sealing cup near the aperture, the support plate having a central bore adapted to receive the check valve; and a spring disposed between the plunger and the support plate.

9. The chain tensioner of claim 8 wherein the plunger includes an upper end with an aperture, an air vent disc being disposed between the upper end of the plunger and the spring.

10. A chain tensioner with an integral body and arm assembly comprising:

a tensioner body, the tensioner body including a fluid reservoir and a tensioner bore;

a check valve connecting the fluid reservoir to the tensioner bore to permit fluid flow from the fluid reservoir into the tensioner bore and restrict fluid flow from the tensioner bore into the fluid reservoir;

a plunger slidably fitted in the tensioner bore;

a tensioner arm operatively connected to the tensioner body, the tensioner arm having a pivot bore;

a pivot pin disposed in the pivot bore, the pivot pin mounting the tensioner arm for pivotal rotation with respect to a mounting block;

a boss fixedly mounted to the mounting block;

a flow of fluid into the tensioner bore causing the plunger to extend from the tensioner bore and against the boss to cause rotational movement of the tensioner body and tensioner arm; and, the tensioner body has an opening opposite the tensioner arm to permit the flow of fluid into the fluid reservoir.

11. The chain tensioner of claim 10 wherein a fluid retention plate is disposed in the opening of the tensioner body to retain fluid within the fluid reservoir.

12. The chain tensioner of claim 11 wherein the fluid retention plate includes a central orifice and a plurality of pockets to retain fluid that spills from the fluid reservoir through the central orifice.

13. The chain tensioner of claim 12 wherein the fluid retention plate has a funnel-shaped portion to direct fluid to the central orifice.

* * * * *